United States Patent
Doan

[19]

[11] Patent Number: 5,988,929
[45] Date of Patent: Nov. 23, 1999

[54] EASY-OUT CABLE SOCKET WEDGE AND METHOD FOR USE THEREOF

[75] Inventor: Stephen P. Doan, Hillsboro, Oreg.

[73] Assignee: Columbia Steel Casting Co., Portland, Oreg.

[21] Appl. No.: 08/948,229

[22] Filed: Oct. 9, 1997

Related U.S. Application Data

[60] Provisional application No. 60/028,045, Oct. 9, 1996.

[51] Int. Cl.$^6$ ................................................... B25G 3/28
[52] U.S. Cl. .................. 403/281; 403/374.1; 403/409.1; 24/136 K
[58] Field of Search ............................... 403/16, 209, 211, 403/213, 374.1, 409.1, 281; 24/136 R, 136 K, 115 M

[56] References Cited

U.S. PATENT DOCUMENTS

| | | |
|---|---|---|
| 1,248,991 | 12/1917 | Barger . |
| 1,297,187 | 3/1919 | Lamb . |
| 1,315,969 | 9/1919 | Kienzle . |
| 1,644,376 | 10/1927 | Haworth . |
| 1,647,398 | 11/1927 | Draheim et al. . |
| 2,573,806 | 11/1951 | Paterson . |
| 2,597,626 | 5/1952 | Eder . |
| 3,329,928 | 7/1967 | Broske . |
| 3,335,470 | 8/1967 | Baer . |
| 3,681,808 | 8/1972 | Hahn et al. . |
| 3,905,711 | 9/1975 | Rogers . |
| 4,027,939 | 6/1977 | White . |
| 4,066,368 | 1/1978 | Mastalski et al. . |
| 4,074,916 | 2/1978 | Schindler . |
| 4,102,019 | 7/1978 | Boden . |
| 4,313,243 | 2/1982 | Childress et al. . |
| 4,407,471 | 10/1983 | Wilmsmann et al. . |
| 4,561,154 | 12/1985 | Briscoe et al. . |

FOREIGN PATENT DOCUMENTS 552447  5/1977  Russian Federation ............... 403/211

OTHER PUBLICATIONS

Illustration of Easy–Out Wedge from Columbia, publically used or offered for sale in 1993.

*Primary Examiner*—Lynne A. Reichard
*Assistant Examiner*—David E. Bochna
*Attorney, Agent, or Firm*—Klarquist Sparkman Campbell Leigh & Whinston, LLP

[57] ABSTRACT

A cable socket wedge has two wedge halves held apart by at least three blocks, such that cutting the blocks allows the wedge halves to collapse inward, loosening the wedge and cable in the socket. Crushable inserts are located in the spaces between adjacent pairs of the blocks, between the wedge halves so as to provide sufficient crushable volume to allow the wedge halves to move toward each other when the blocks are cut. The wedge is employed with a socket having a window therein. The window is positioned in the socket such that, with a properly sized cable and wedge, the central of the three blocks is accessible through the window in the socket when a cable is secured and tightened with the wedge in the socket.

23 Claims, 4 Drawing Sheets

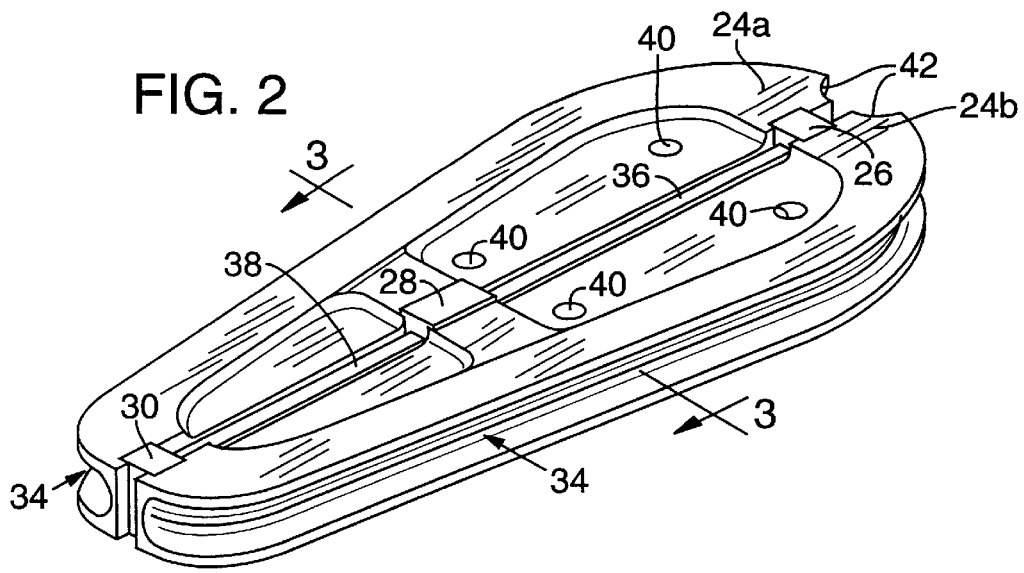
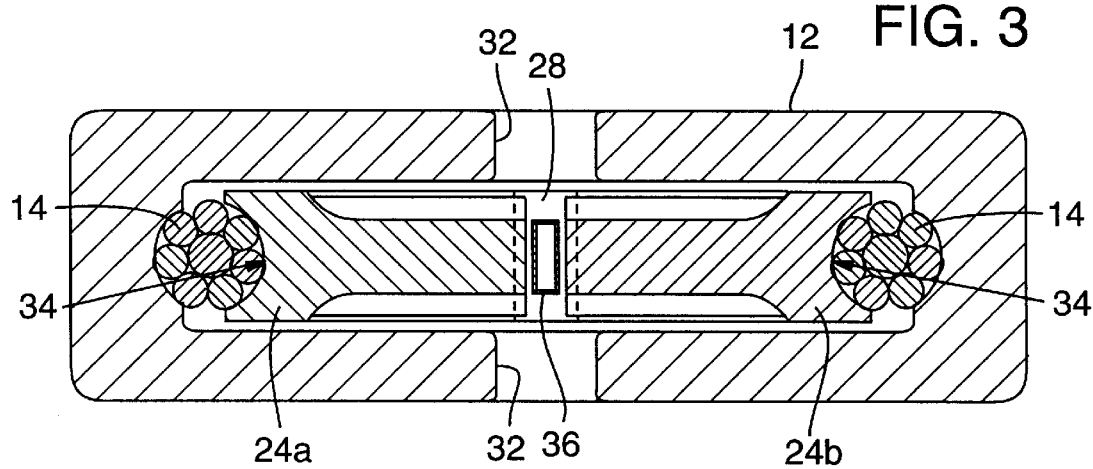
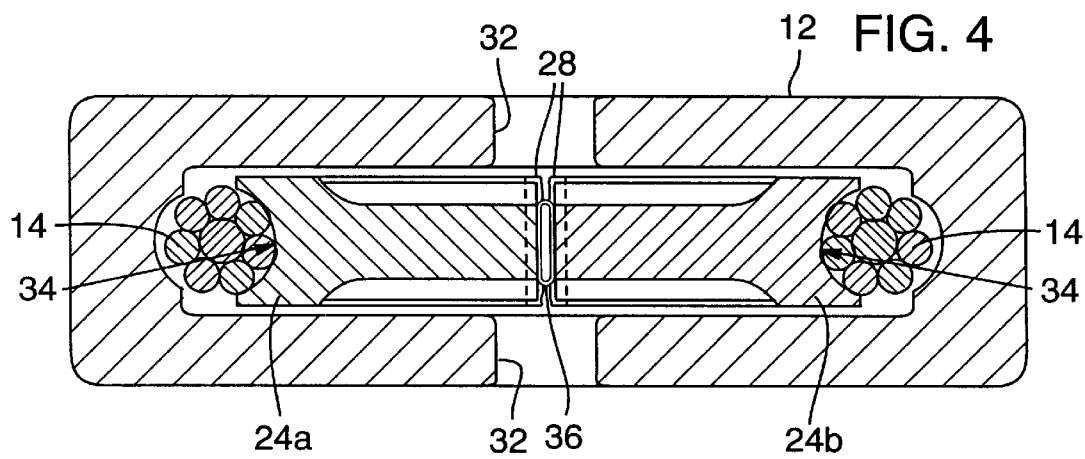

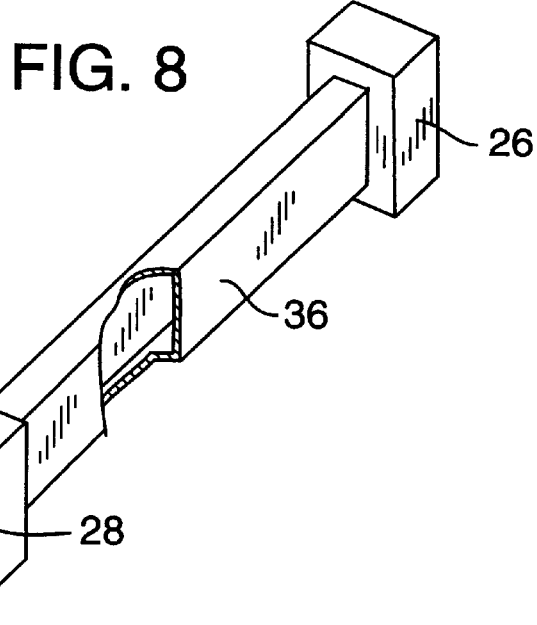
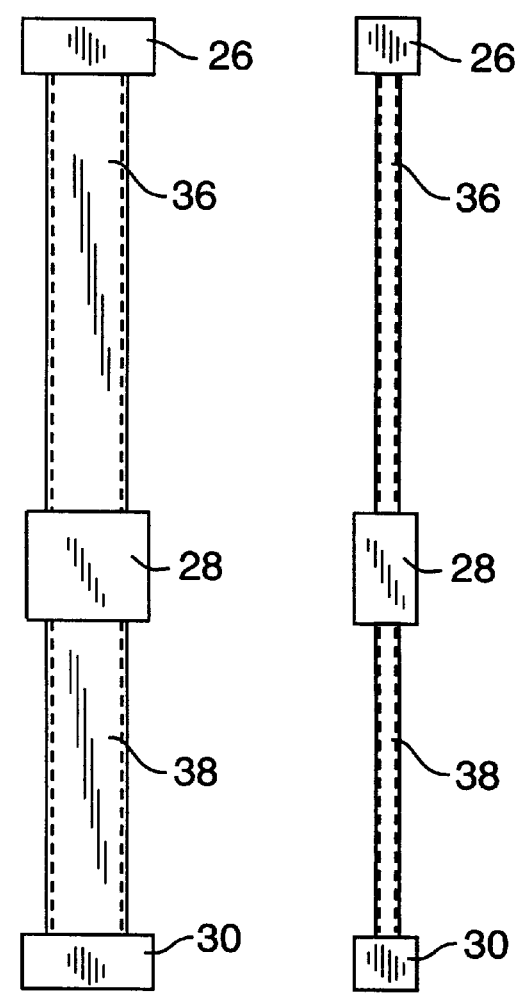

EASY-OUT CABLE SOCKET WEDGE AND METHOD FOR USE THEREOF

This application claims the benefit of U.S. Provisional Application No. 60/028,045, filed Oct. 9, 1996.

FIELD OF THE INVENTION

This invention relates generally to devices and methods for securing a cable to a machine element. More particularly, this invention relates to an easily removable cable socket wedge, an accompanying cable socket, and methods for the use of the wedge and socket.

BACKGROUND OF THE INVENTION

Cable sockets and cable socket wedges are used to secure cables to machine elements, particularly to secure large diameter wire ropes to such machine elements as drag lines, hoist lines, and other lines employed with drag line buckets used in open face mining operations.

Drag line buckets are used for moving large quantities of earth and rock. The bucket is dragged across the mine surface by large cables, scooping up earth and rock. The cables that carry and drag the bucket, especially those that drag along the surface of the earth, must be replaced periodically.

Large drag line buckets have volumetric capacities in excess of one hundred cubic yards. The wire ropes employed to drag and hoist such large drag line buckets are typically about four inches in diameter or more. Such large diameter cables are difficult to work with.

Cables are usually secured to the bucket, or to chains connected to the bucket, by cable sockets and cable socket wedges. The cable is first fed through the socket, leaving a large loop. Then a wedge is placed in the socket and the cable is pulled down over the wedge, tightening the wedge into the socket. The edges of the wedge and the inside surfaces of the socket press on the cable, retaining it in the socket.

Replacing worn cables can be a major undertaking. Because of the tremendous forces involved in dragging and hoisting the bucket, the cable socket wedges can become very tightly wedged in the cable socket. Because of the large scale of the equipment, downtime, for cable replacement or any other reason, is very expensive. Thus quick cable replacement is needed.

One approach to quick cable replacement is to replace the entire socket, and to remove the used socket from the mine site to a shop having a large hydraulic ram with which to remove the wedge from the socket. This approach can produce considerable inconvenience, especially in the case of a relatively remote mine site.

Another approach, is to remove the wedge from the socket by blasting it out with explosives. This approach involves obvious hazards.

In response to the need presented by the above-described conditions, various easy-out wedge designs have been proposed and even utilized in the past. But none of the attempted designs has been both reliable in service and easily removable at the end of service. Wedges that hold up during service, particularly with wire rope diameters approaching four inches or larger, are not easily removable for cable replacement. Wedges that are more easily removable can fail during service, particularly with larger cable diameters and larger dragline bucket sizes.

SUMMARY OF THE INVENTION

In accordance with the foregoing, it is one object of the present invention to provide an easily removable cable socket wedge and cooperating socket and a method for using the same, such that both reliability and easy removability are routinely achieved. This object is attained by a cable socket wedge having two halves held apart by three blocks, such that cutting the three blocks allows the wedge halves to collapse inward, loosening the wedge and cable in the socket. Crushable inserts are placed in the two spaces between adjacent pairs of the three blocks, between the wedge halves. The crushable inserts extend substantially from one block to the next and serve to prevent incompressible debris from filling the spaces between the wedge halves between the blocks, thereby guaranteeing a crushable volume sufficient to allow the wedge halves to collapse when the blocks are cut.

The wedge halves are preferably cast steel, the blocks are preferably alloy steel milled to size, and the crushable inserts are preferably rectangular-section steel tubing. The wedge halves preferably have slots or sockets to receive the blocks.

To assemble the wedge of the present invention, the blocks are preferably put in place between the wedge halves, then the crushable inserts are positioned between the blocks and tack-welded to the blocks. Next, the blocks are fillet-welded to the wedge halves.

The wedge of the present invention is employed with a socket having a window therein. The window is positioned in the socket such that, with a properly sized cable and wedge, the central of the three blocks is accessible through the window in the socket when a cable is secured and tightened with the wedge in the socket.

When the cable is to be removed from the socket, the three blocks are cut by a cutting torch or the like. The compression forces on the wedge then crush the crushable inserts, collapsing the wedge for easy removal of the wedge and cable.

Other features, objects, and advantages of the present invention will be apparent to one of skill in the art from practice of the invention or from the description of a preferred embodiment below.

BRIEF DESCRIPTION OF THE DRAWINGS

FIG. 2 shows a perspective view of an embodiment of a cable socket wedge constructed in accordance with the present invention.

FIG. 3 is an enlarged cross-sectional view of a wedge and socket taken along line 3—3 of FIG. 2.

FIG. 4 is a view similar to FIG. 3 after the wedge has been collapsed for easy removal of the cable and wedge from the socket.

FIG. 8 is an enlarged perspective view, partly broken away, of the insert blocks and crushable inserts as they would appear assembled in the cable socket wedge of FIG. 5.

FIGS. 9 and 10 are side and edge elevations, respectively, of the insert blocks and crushable inserts of FIG. 8.

DETAILED DESCRIPTION OF A PRESENTLY PREFERRED EMBODIMENT

Figure 1:
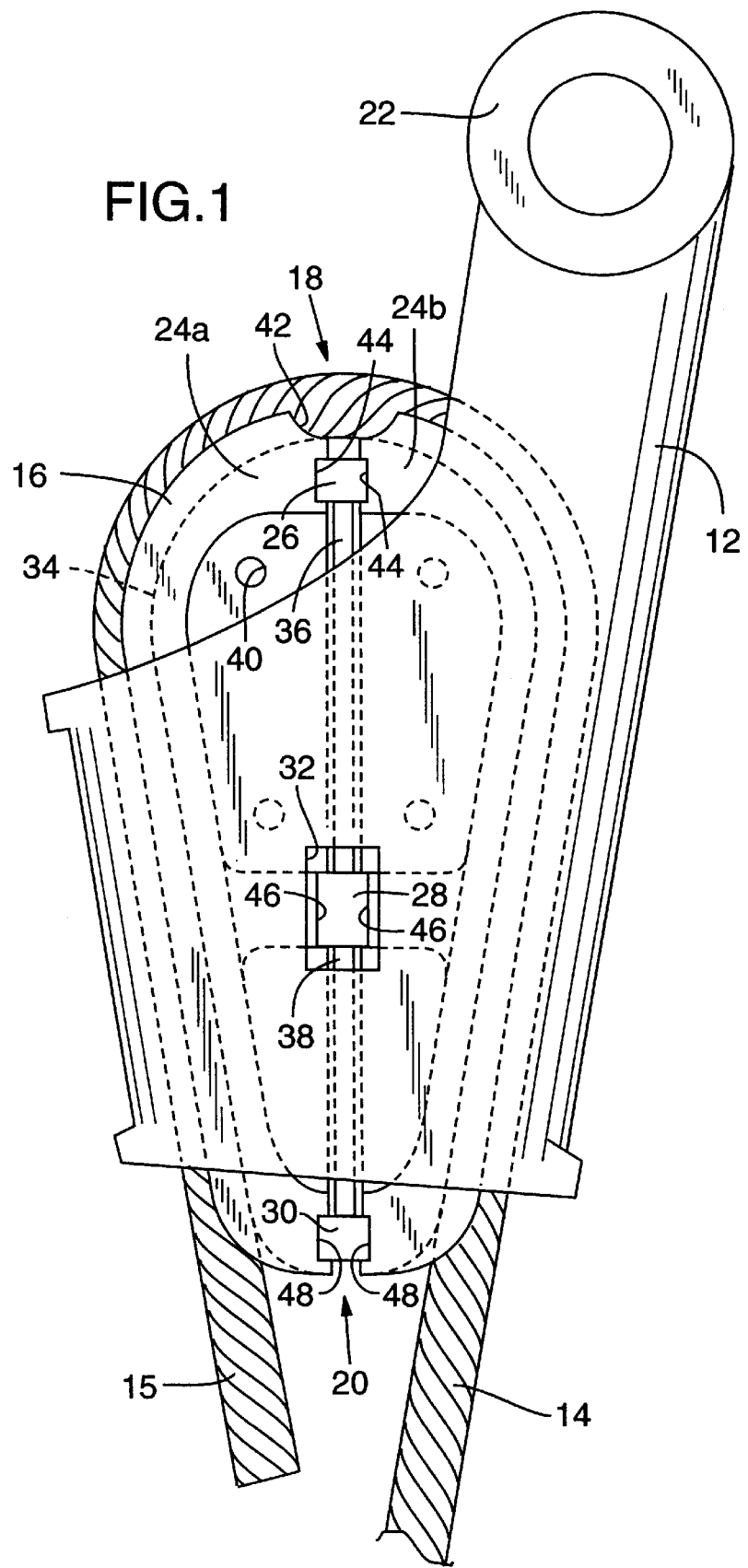
FIG. 1 shows an elevation view of an embodiment of a cable socket and cable socket wedge constructed in accordance with the present invention and assembled to secure a cable.

FIG. 1 shows a presently preferred embodiment of a cable socket and a cable socket wedge according to the present invention, assembled to secure a cable. To secure a cable 14 in a cable socket 12 as shown, the cable 14 is first threaded loosely into the cable socket 12, with tag end 15 of the cable 14 doubled back through the socket, but leaving a large loop above the socket as the socket is shown in FIG. 1. The cable socket wedge 16 is then placed loosely into the cable socket. The cable is then pulled in a direction downward in FIG. 1, to tighten the cable around the large end 18 of the wedge 16 and pull the wedge into the socket. The smaller end 20 of the wedge 16 is forced down into the socket 12 by the tightening cable until the wedge 16 secures the cable 14 between the outer surface of the wedge 16 and the inner surface of the socket 12. The socket 12 is provided with at least one connection point 22 for securing the socket to a dragline chain or other attachment point.

The wedge 16 includes two identical wedge halves 24a and 24b. Insert blocks 26, 28, and 30 are positioned between the wedge halves 24a and 24b and hold the wedge halves apart. The wedge 16 and the socket 12 are shaped and sized such that, when the desired diameter cable is positioned in the socket 12 with the wedge 16 as shown, the insert blocks 26 and 30 are accessible at the top and bottom of the socket 12, as shown, and the center insert block 28 is accessible in a window 32 provided in the socket 12.

As shown in FIGS. 1, 2, and 3, the wedge halves 24a and 24b are held apart by insert blocks 26, 28, and 30. The outer edges of the wedge halves 24a and 24b are provided with a rope channel 34 for holding a cable. The wedge halves are preferably steel castings. The insert blocks must be particularly tough to withstand, in a relatively small cross section, the entire clamping forces exerted by the wedge on a cable. The insert blocks are thus preferably formed of alloy steel, milled to size as required.

A crushable insert 36 extends the length of the space between the insert block 26 and the center insert block 28. A shorter crushable insert 38 extends the length of the space between the center insert block 28 and the insert block 30. The crushable inserts perform an important function. Without the crushable inserts, dirt and rock debris can fill the spaces between the insert blocks, preventing easy collapse of the wedge for removal. The crushable inserts thus must be strong enough to prevent dirt and rock from filling the spaces between the insert blocks, but must provide an airspace or other crushable volume to allow easy collapsing and removal of the wedge. Rectangular section steel tubing is preferred for use as the crushable inserts 36 and 38, and is sized to extend from one insert block to the next and to be substantially the same width as the thickness of the webbing of the wedge, as may be seen in FIG. 3. The crushable inserts need not fill all of the space between the central webbing of the two wedge halves, as long as sufficient crushable volume is provided over the area between the webbing such that the wedge is easily removable from the socket.

Figure 5:
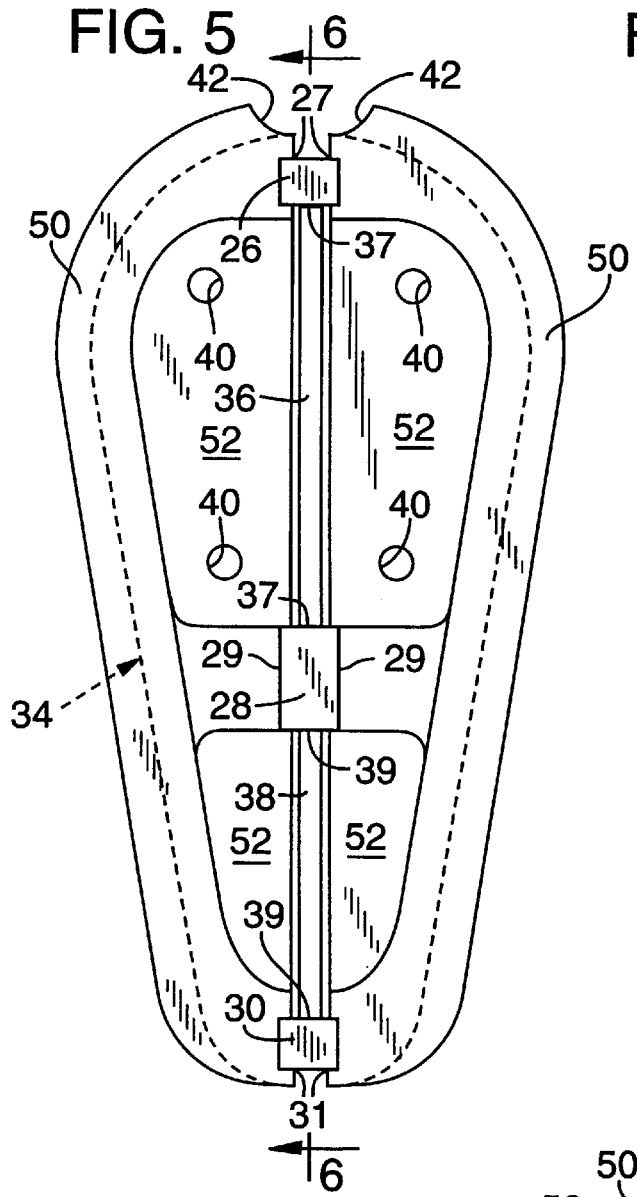
FIG. 5 a plan view of an embodiment of an assembled cable socket wedge according to the present invention.
Figure 6:
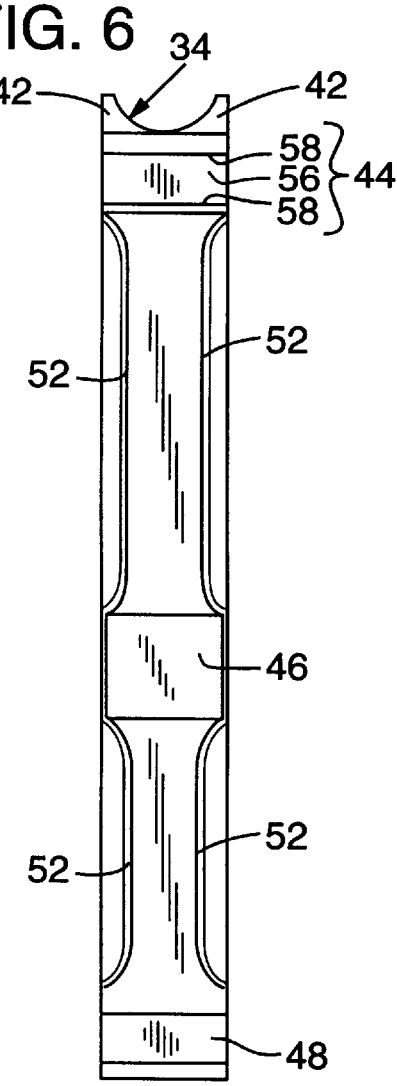
FIG. 6 is a view of one-half of the cable socket wedge of FIG. 5 looking in the direction of the arrows 6—6 in FIG. 5 with the insert blocks and the crushable inserts removed.
Figure 7:
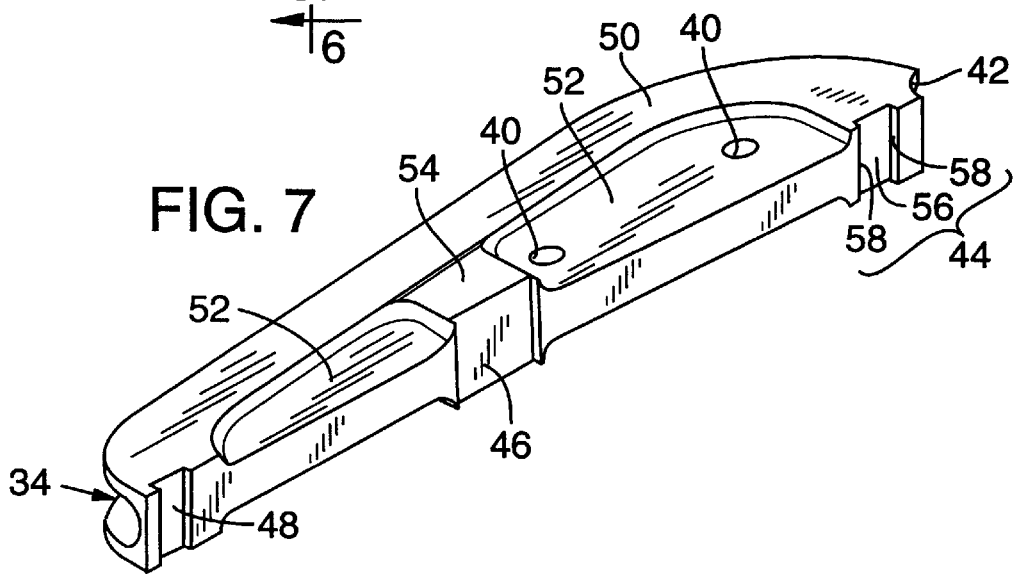
FIG. 7 is a perspective view of the one-half of the cable socket wedge of FIG. 6.

The preferred method of securing together the parts of a wedge according to the present invention is to weld the individual parts together at weld locations shown in FIG. 5. First, the two halves of the wedge are assembled with the insert blocks 26, 28 and 30 in place. The wedge halves are preferably provided with slots or sockets 44, 46, and 48, as shown in FIGS. 6 and 7, for receiving the insert blocks. The insert blocks and the cooperating sockets are sized such that each insert block contacts each wedge half on three surfaces, on the base 56 of the socket and on both sides 58 of the socket. This allows full-surface shims to be used in the bottom of the sockets, if needed, when reconstructing a wedge, without interfering with the weld locations described below.

After the insert blocks are in place, the crushable inserts 36 and 38 are positioned between the insert blocks as shown in FIG. 5 and secured to the insert blocks by tack welding. The crushable insert 36 is tack-welded to the insert blocks at the two locations 37 and at two corresponding locations on the reverse side of the wedge, and the crushable insert 38 is tack-welded to the insert blocks at the two locations 39 and at two corresponding locations on the reverse side of the wedge. The insert blocks are then welded to the wedge halves. Insert block 26 is welded to the wedge halves by fillet welds at the two locations 27. Insert block 30 is welded to the wedge halves by fillet welds at the two locations 31. Center insert block 28 is welded to the two wedge halves by fillet welds at four locations, the two locations 29 as shown and the two corresponding locations on the reverse side of the wedge. For these fillet welds, the wedge halves and insert blocks should be pre-heated to the range of about 400 to 800° F. for HSLA steel. Pre-heating is not necessary for the tack welds.

To assemble a wedge according to the present invention, if the wedge is not new (i.e., if it has been used and removed before) the cut halves of the insert blocks and the associated welds must first be removed from the wedge halves by electric arc or other suitable means. The insert block sockets 44, 46, and 48 are then cleaned, and new insert blocks 26, 28, and 30 and crushable inserts 36 and 38 are installed as above.

As shown in FIG. 5, the wedge halves are provided with holes 40 for use in handling the wedge or wedge halves. The wedge may also have a cut-out 42 which exposes a cable on the wedge so that the cable may be cut at cut-out 42 without damage to the wedge.

To remove a wedge 16 from a socket 12, the insert blocks 26, 28 and 30 are cut through with a torch or electric arc. As is apparent in FIG. 1, the insert blocks 26 and 30 are exposed above and below the socket, respectively, while the insert block 28 is accessible for cutting through the window 32. When the center portion of each of the insert blocks is cut away, the wedge halves 24a and 24b collapse toward each other due to the built-up compressive forces thereon, crushing the crushable inserts 36 and 38 and freeing the wedge and cable so that the wedge and cable bight may be backed out of the socket with relative ease. To facilitate the wedge removal, the cable may also be cut at the base of the socket and above the cutout 42.

Certain features of an embodiment of a wedge half may be seen in FIG. 7. The wedge half includes a raised rim 50 in which is defined the rope channel 34, and webbing 52 which is of somewhat lesser thickness than the rim 50. A central rib 54 divides the webbing 52 into two sections and provides support for the center insert block socket 46. The central rib 54 and the center insert block socket 46 defined therein is slightly thinner than the rim 50, as shown, sufficient to allow the fillet welds described above to be made against the center insert block, the width of which is equal to the thickness of the rim 50. Insert block sockets 44 and 48 are recessed sufficiently to provide a strong socket while still allowing easy access to the insert blocks in the sockets through the bottom of the rope channel.

FIG. 8 shows the insert blocks 26, 28 and 30 together with the crushable inserts 36 and 38 as installed in a wedge. The cutaway illustration shows the thin walls of the crushable inserts. Other types of inserts, such as inserts of foamed or other crushable material, may also be used. The width of the crushable inserts, best seen in FIG. 9, is preferably about the same as the thickness of the webbing of the wedge halves, while the width of each of the insert blocks is preferably equal to the widest width of the wedge halves, i.e., the width of the rim. The thickness of the crushable inserts, best seen in FIG. 10, need not fill the entire gap between opposing faces of the wedge halves. The crushable inserts need only provide sufficient crushable volume to allow the wedge to collapse and be easily removed from the socket.

The preferred embodiment described above provides an easily removable and easily reconstructed cable socket wedge and cable socket assembly. The central location of the insert blocks results in well distributed forces on the insert blocks, and the insert blocks are optimally located for easy cutting for removal of the wedge. The center insert block has a larger cross section to carry the majority of the load. The crushable inserts extend from one insert block to the next, providing a crushable volume along the entire length of the space between insert blocks. The recessed insert block sockets retain the insert blocks in the proper locations. These features and others result in a strong, reliable, re-usable cable socket wedge and socket assembly, in which a used wedge may be easily removed, and relatively easily re-assembled for re-use. For fast cable replacement, only the wedge and cable need be replaced, and no explosives are needed to remove the wedge.

Other configurations of cable socket and wedge assemblies may of course be designed. More than three insert blocks may be used, for example, and the size and location of the insert blocks may be varied as needed or desired for different applications. Crushable inserts should be provided in the space, if any, between each adjacent pair of insert blocks. In view of the many possible embodiments to which the principles of the present invention may be applied, it should be recognized that the illustrated embodiments are only preferred examples of the invention and should not be taken as a limitation on the scope of the invention.

I claim:

1. A cable socket wedge for securing a cable in a cable socket, the wedge comprising:
    (a) two wedge halves shaped such that wedging action of the wedge presses the halves together;
    (b) at least three blocks positioned between the wedge halves, each contacting and separating the wedge halves, the blocks having sufficient compressive strength to withstand the compression forces on the wedge during use of the wedge, the blocks being so located between the wedge halves so as to be accessible to a cutting torch or the like, when the wedge is employed in a cable socket to secure a cable; and
    (c) a plurality of crushable inserts of a predetermined width positioned between the wedge halves, said inserts being crushable in the width dimension to a dimension less than said predetermined width, said inserts extending from one block to the next, one between each adjacent pair of the at least three blocks so as to provide sufficient crushable volume between the wedge halves, protected from filling with non-crushable debris, to allow the wedge to collapse when the blocks are cut, allowing removal of the wedge from the cable socket.

2. The cable socket wedge as recited in claim 1 wherein the two wedge halves are identical.

3. The cable socket wedge as recited in claim 1 wherein each of the two wedge halves comprises at least three slots for receiving the at least three blocks.

4. The cable socket wedge as recited in claim 1 wherein the crushable inserts comprise rectangular-section steel tubing.

5. The cable socket wedge as recited in claim 1 wherein the two wedge halves comprise cast steel, and the at least three blocks comprise alloy steel.

6. The cable socket wedge as recited in claim 1 wherein the at least three blocks are exactly three blocks.

7. The cable socket wedge as recited in claim 6 wherein a central one of the exactly three blocks is larger than the other two of the exactly three blocks.

8. The cable socket wedge of claim 7 wherein the cable socket wedge has a small end and a large end, and wherein the central one of the exactly three blocks is positioned closer to the small end than to the large end of the cable socket wedge.

9. The cable socket wedge of claim 1 wherein the crushable inserts are attached to the at least three blocks.

10. The cable socket wedge of claim 9 wherein the crushable inserts are welded to the at least three blocks.

11. The cable socket wedge of claim 1 wherein the at least three blocks are attached to the two wedge halves.

12. The cable socket wedge of claim 1 wherein the at least three blocks are welded to the two wedge halves.

13. A cable socket wedge and socket assembly comprising:
    a cable socket wedge comprising (1) two wedge halves shaped such that wedging action of the wedge presses the halves together, (2) three blocks positioned between the wedge halves, each contacting and separating the wedge halves, the blocks having sufficient compressive strength to withstand the compression forces on the wedge during use of the wedge, the blocks being so located between the wedge halves so as to be accessible to a cutting torch or the like, when the wedge is employed in a cable socket to secure a cable, and (3) two crushable inserts of a predetermined width positioned between the wedge halves, said inserts being crushable in the width dimension to a dimension less than said predetermined width, said inserts extending from one block to the next, one between each adjacent pair of the at least three blocks so as to provide sufficient crushable volume between the wedge halves, protected from filling with non-crushable debris, to allow the wedge to collapse when the blocks are cut, allowing removal of the wedge from the cable; and
    a cable socket having a window therein, the window located such that a central one of the three blocks of the wedge is accessible through said window, so as to be able to cut the central one of the three blocks, when the wedge and cable socket assembly is assembled with a cable to secure a cable in the cable socket.

14. A cable socket wedge for use with a cable socket to secure a cable in the cable socket, the wedge comprising:
    two wedge halves;
    at least three blocks holding apart the two wedge halves, leaving a space between the wedge halves; and
    crushable material positioned in the space between the wedge halves not occupied by the blocks in an amount sufficient to prevent non-crushable debris from so filling a portion of the space between the wedge halves as to keep the wedge from collapsing when the blocks are cut, the crushable extending between the wedge halves from one block to the next.

15. The cable socket wedge as recited in claim 14 wherein the crushable material comprises rectangular-section tubing.

16. The cable socket wedge as recited in claim 14 wherein the two wedge halves each comprise at least three slots for respectively receiving the at least three blocks, the slots sized relative to the blocks such that each block contacts each wedge half on three surfaces of each block.

17. The cable socket wedge as recited in claim 14 wherein the at least three blocks are exactly three blocks, including a central block, and wherein the two wedge halves each comprise three slots for receiving the three blocks, including a central slot for receiving the central block, and wherein the central block extends, in the direction along each central slot, beyond the ends of each central slot.

18. A method of assembling a cable socket wedge comprising the steps of:

first, providing two halves of a cable socket wedge;

second, positioning three blocks, including one central block, between the two halves of the cable socket wedge;

third, positioning a crushable insert between each adjacent pair of the three blocks, between the two halves of the cable socket wedge, each crushable insert extending from one block of the adjacent pair of the three blocks to the other block of said adjacent pair of the three blocks; and fourth, securing each crushable insert between the adjacent ones of the three blocks and securing the three blocks to the two halves of the cable socket wedge, thereby completing the cable socket wedge.

19. The method of claim 18 wherein securing each crushable insert between the adjacent ones of the three blocks comprises attaching each crushable insert to the adjacent ones of the three blocks.

20. The method of claim 18 wherein securing the three blocks to the two halves of the cable socket wedge comprises welding the three blocks to the two halves of the cable socket wedge.

21. A cable socket wedge for securing a cable in a cable socket, the wedge comprising:

a body having two substantially parallel opposing surfaces and a circumferential edge generally perpendicular to and adjoining the substantially parallel opposing surfaces, the body including a rounded large end, a small end, and straight sides adjoining the rounded large end and the small end and tapering from the rounded large end to the small end, the circumferential edge further including a rope channel for receiving a cable, the body comprising two halves separated and held apart, along a line midway between the straight sides of the body, by a first block, a second block, and a third block, each half having a first slot, a second slot, and a third slot for receiving the first block, the second block, and the third block, respectively, such that each block of the first, second, and third blocks is contacted, by each half, on at least three surfaces of each block, each block being fixedly secured to each of the halves;

a first crushable insert positioned between the halves and extending from the first block to the second block and fixedly secured to the first block and the second block; and a second crushable insert positioned between the halves and extending from the second block to the third block and fixedly secured to the second block and the third block.

22. A cable wedge for securing a cable in a cable socket, the wedge comprising:

(a) two wedge halves comprising cast steel shaped such that wedging action of the wedge presses the halves together;

(b) at least three blocks comprising alloy steel positioned between the wedge halves, each contacting and separating the wedge halves, the blocks having sufficient compressive strength to withstand the compression forces on the wedge during use of the wedge, the blocks being so located between the wedge halves so as to be accessible to a cutting torch or the like, when the wedge is employed in a cable socket to secure a cable; and (c) crushable inserts positioned between the wedge halves, between each adjacent pair of the at least three blocks, extending substantially from one block to the next, thereby preventing relatively incompressible debris from filling the space between the wedge halves between each adjacent pair of the at least three blocks, and thereby allowing the wedge to collapse, allowing removal of the wedge from the cable socket, when the blocks are cut.

23. A cable wedge for securing a cable in a cable socket, the wedge comprising:

(a) two wedge halves shaped such that wedging action of the wedge presses the halves together;

(b) at least three blocks positioned between the wedge halves, each contacting and separating the wedge halves, the blocks having sufficient compressive strength to withstand the compression forces on the wedge during use of the wedge, the blocks being so located between the wedge halves so as to be accessible to a cutting torch or the like, when the wedge is employed in a cable socket to secure a cable; and (c) crushable inserts positioned between the wedge halves, between each adjacent pair of the at least three blocks, extending substantially from one block to the next, thereby preventing relatively incompressible debris from filling the space between the wedge halves between each adjacent pair of the at least three blocks, and thereby allowing the wedge to collapse, allowing removal of the wedge from the cable socket, when the blocks are cut, the crushable inserts being attached to the at least three blocks.

* * * * *

UNITED STATES PATENT AND TRADEMARK OFFICE
CERTIFICATE OF CORRECTION

PATENT NO. : 5,988,929
DATED : November 23, 1999
INVENTOR(S) : Stephen P. Doan

It is certified that error appears in the above-identified patent and that said Letters Patent is hereby corrected as shown below:

Claims:
Column 6,
Line 66, reads "crushable extending". It should read -- crushable materials extending --.

Column 8,
Line 25, reads "extending substantially from". It should read -- extending from --.

Signed and Sealed this

Fourth Day of September, 2001

*Attest:*

*Attesting Officer*

NICHOLAS P. GODICI
*Acting Director of the United States Patent and Trademark Office*